United States Patent
Davis et al.

(10) Patent No.: US 10,376,993 B2
(45) Date of Patent: Aug. 13, 2019

(54) FLASH TRAP

(71) Applicant: ILLINOIS TOOL WORKS INC., Glenview, IL (US)

(72) Inventors: Joseph D. Davis, Archbold, OH (US); Tyler L. Terrell, Bryan, OH (US)

(73) Assignee: Illinois Took Works Inc., Glenview, IL (US)

( * ) Notice: Subject to any disclaimer, the term of this patent is extended or adjusted under 35 U.S.C. 154(b) by 961 days.

(21) Appl. No.: 14/872,523

(22) Filed: Oct. 1, 2015

(65) Prior Publication Data
US 2017/0095890 A1 Apr. 6, 2017

(51) Int. Cl.
| | |
|---|---|
| *B23K 33/00* | (2006.01) |
| *F01P 11/04* | (2006.01) |
| *B23K 20/00* | (2006.01) |
| *B23K 20/12* | (2006.01) |
| *B23K 31/02* | (2006.01) |
| B23K 101/06 | (2006.01) |
| B23K 101/00 | (2006.01) |

(52) U.S. Cl.
CPC .......... *B23K 33/008* (2013.01); *B23K 20/002* (2013.01); *B23K 20/008* (2013.01); *B23K 20/12* (2013.01); *B23K 20/129* (2013.01); *B23K 31/02* (2013.01); *B23K 33/006* (2013.01); *F01P 11/04* (2013.01); *B23K 2101/006* (2018.08); *B23K 2101/06* (2018.08)

(58) Field of Classification Search
CPC .... B23K 20/002; B23K 20/008; B23K 20/12; B23K 20/129; B23K 31/02; B23K 33/006
See application file for complete search history.

(56) References Cited

U.S. PATENT DOCUMENTS

| | | | | |
|---|---|---|---|---|
| 2,360,279 A | * | 10/1944 | Rollert | H01T 21/02 219/107 |
| 3,429,591 A | * | 2/1969 | Loyd | B23K 20/129 285/189 |
| 3,618,196 A | * | 11/1971 | Sluetz | B23K 20/129 156/73.5 |
| 3,944,307 A | * | 3/1976 | Bingle | B29C 65/08 384/576 |
| 4,222,407 A | * | 9/1980 | Ruschke | F16K 15/141 137/512.15 |
| 4,595,067 A | * | 6/1986 | Drake | B22F 7/06 175/331 |
| 4,601,927 A | * | 7/1986 | Durfee | B29C 65/06 156/292 |
| 5,152,788 A | * | 10/1992 | Isaacson | A61F 2/1613 156/73.1 |
| 5,154,340 A | * | 10/1992 | Peacock | B23K 20/12 228/114 |
| 5,568,160 A | * | 10/1996 | Collins | H01Q 21/0087 343/776 |
| 5,670,108 A | * | 9/1997 | Kern | B29C 65/20 156/292 |
| 5,965,019 A | * | 10/1999 | Olsen | B01D 27/005 210/331 |

(Continued)

*Primary Examiner* — Daniel J Wiley
(74) *Attorney, Agent, or Firm* — Quarles & Brady LLP

(57) ABSTRACT

A manifold assembly for an automobile cooling system includes a crossover tube and a crossover tube cover welded in an opening of the crossover tube A flash trap is provided adjacent the region of the weld joint to receive and capture weld flash migrating inwardly in the crossover tube.

20 Claims, 4 Drawing Sheets

(56) References Cited

U.S. PATENT DOCUMENTS

2010/0150491 A1* 6/2010 Cymbal ................. F16C 33/60
                                                      384/569
2012/0216903 A1* 8/2012 Osborne ............... B65H 69/08
                                                      138/137

* cited by examiner

FLASH TRAP

CROSS REFERENCE TO RELATED APPLICATIONS

The present application claims the benefits of U.S. Provisional Application Ser. No. 62/078,456 filed on Nov. 12, 2014.

FIELD OF THE INVENTION

The present invention relates generally to welded assemblies and welding processes, and more particularly to the management and handling of weld flash created in a welded assembly during a welding process.

BACKGROUND OF THE INVENTION

During a material welding process, molten material may flow from the location where the weld is initiated to an area outside of the zone at which the welded components are bonded to one another. Sometimes referred to as "flash", the molten material can harden or freeze in an undesirable location. In some instances, weld flash exposed in an undesirable location can be removed; however, in some assemblies, weld flash can migrate to an enclosed or otherwise inaccessible area so that removal of the weld flash is difficult if not impossible. In some situations, the presence of weld flash can be problematic.

For example, in a known automobile cooling system a crossover tube is provided in a manifold assembly in which the cross over tube is overmolded and substantially inaccessible in the final assembly. The crossover tube includes an opening in which a cap is welded, with the weld being initiated from the outside of the tube. It is known to provide essentially flat confronting surfaces on the cap and on the receiving end of the cross over tube, to define a zone or area of overlap in which the weld joint is established. The welding process is initiated from outside of the tube. During the welding process to affix the cap in the tube, melt occurs, and resultant weld flash is pushed away from the weld, causing it to flow along the confronting surfaces toward the inside of the tube. If the weld flash migrates sufficiently far, the weld flash can become exposed on the inside of the crossover tube. Weld flash exposed in the crossover tube is considered a contaminant in that the weld flash can break loose and can be washed into the engine by the coolant that flows through the interior of the crossover tube. Accordingly, the flow of weld flash into the inside of the crossover tube is an occurrence to be avoided.

What is needed in the art is a way to manage and contain the flow of weld flash, so that the weld flash does not migrate to an undesirable location in the welded assembly.

SUMMARY OF THE INVENTION

An enclosed flash trap or pocket is provided adjacent a weld zone, the pocket being formed between the confronting components being welded, so that the trap or pocket is substantially enclosed. The flash trap or pocket is positioned to receive and trap migrating weld flash, so that no weld flash flows sufficiently far as to be exposed in an undesirable location, such as on the inside of a crossover tube of an engine cooling system. Accordingly, the establishment of a clean and acceptable weld joint is promoted.

In one aspect of one form of the flash trap, a welded assembly is provided with a first component having a first weld joint surface, and a second component having a second weld joint surface. The first weld joint surface and the second weld joint surface confront one another in a weld joint region. A weld joint is formed in the weld joint region. A flash trap is provided in at least one of the first component and the second component adjacent the weld joint surface thereof.

In another aspect of another form of the flash trap, a crossover tube assembly for an automobile cooling system is provided with a crossover tube having an opening and a crossover tube cover disposed in the opening. Confronting surfaces of the crossover tube and the crossover tube cover define a weld joint region. A depression in at least one of the crossover tube and the crossover tube cover defines a flash trap adjacent the weld joint region.

In a further aspect of a further form of the flash trap, a crossover tube assembly for an automobile cooling system is provided with a crossover tube having an opening, a crossover tube cover disposed in the opening, and a weld joint formed between the crossover tube and the crossover tube cover. A flash trap is provided in at least one of the crossover tube and the crossover tube cover inwardly in the crossover tube from the weld joint.

An advantage of a form of a flash trap disclosed herein is that the location of flash from a welding process can be controlled and contained.

Another advantage of a form of the flash trap is that contamination by the presence of flash in a welded component of an automobile cooling system can be reduced.

Other features and advantages of the invention will become apparent to those skilled in the art upon review of the following detailed description, claims and drawings in which like numerals are used to designate like features.

Figure 1:
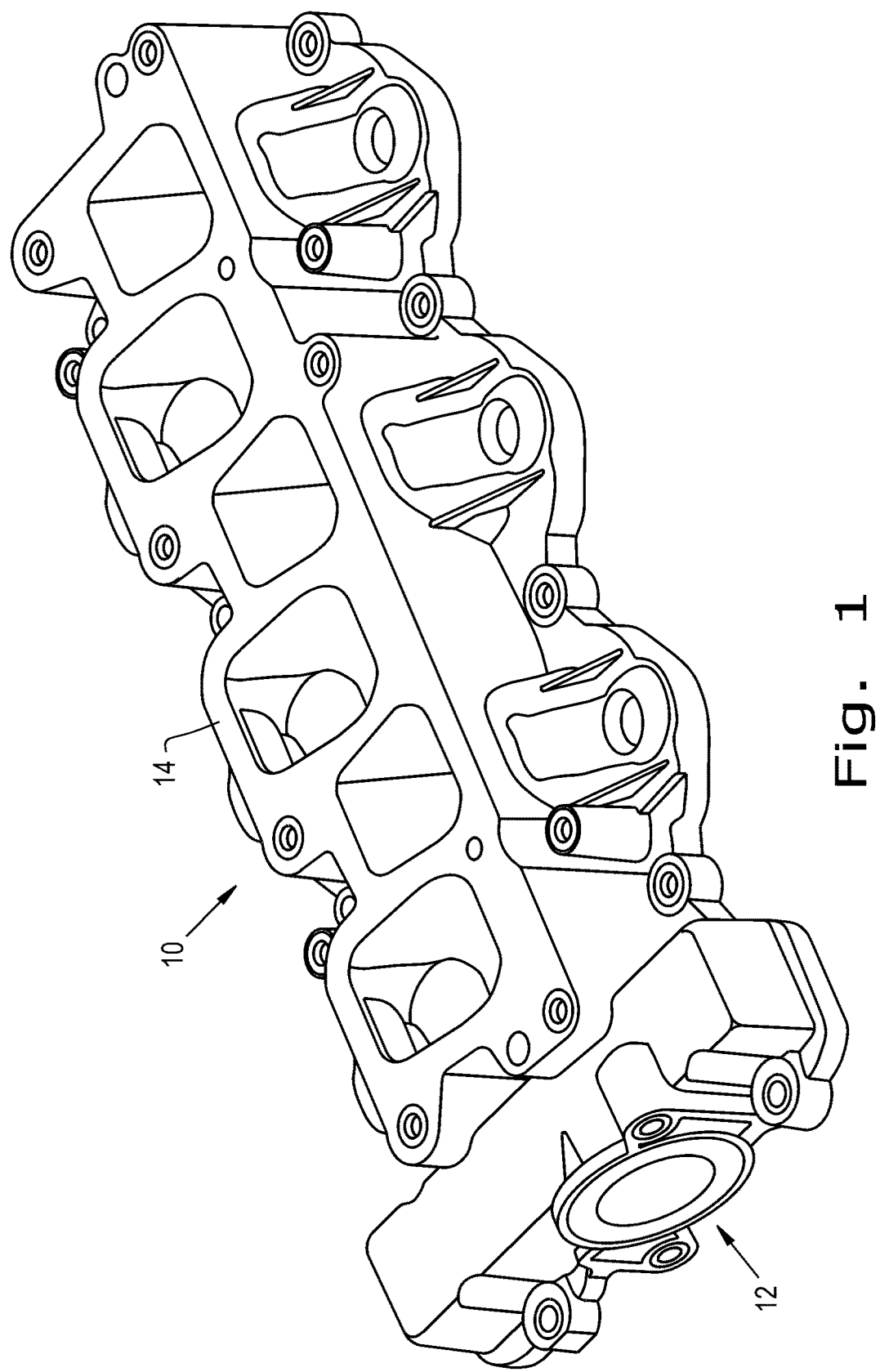
FIG. 1 is a perspective view of a manifold from an automobile cooling system, the manifold including a crossover tube assembly having a cover welded to a crossover tube, in which a flash trap as disclosed herein is used.

Before the embodiments of the invention are explained in detail, it is to be understood that the invention is not limited in its application to the details of construction and the arrangements of the components set forth in the following description or illustrated in the drawings. The invention is capable of other embodiments and of being practiced or being carried out in various ways. Also, it is understood that the phraseology and terminology used herein are for the purpose of description and should not be regarded as limiting. The use herein of "including", "comprising" and variations thereof is meant to encompass the items listed thereafter and equivalents thereof, as well as additional items and equivalents thereof.

DETAILED DESCRIPTION OF THE PREFERRED EMBODIMENT

Figure 2:
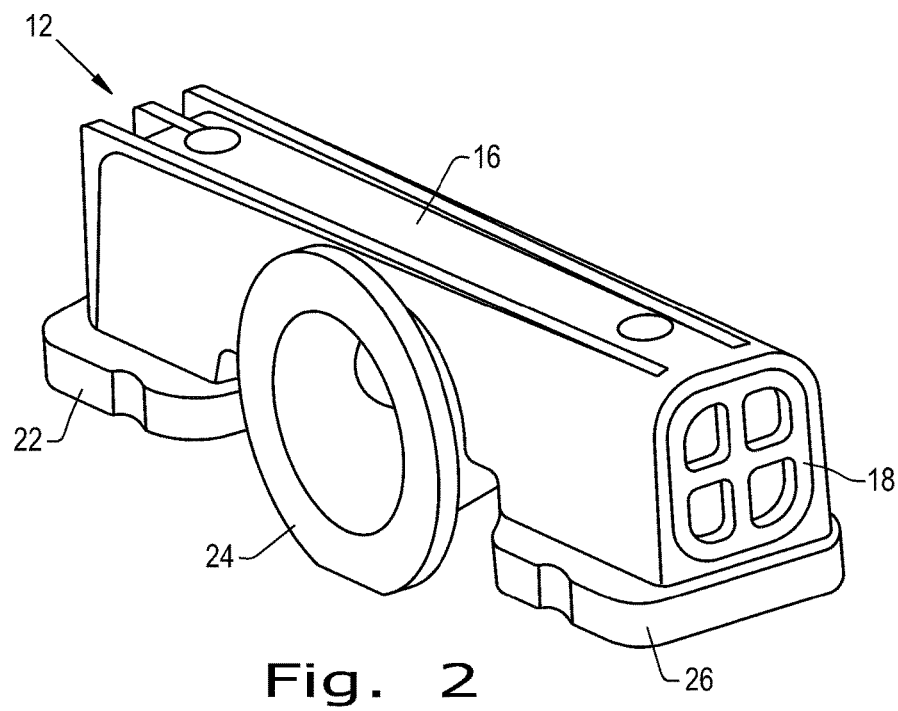
FIG. 2 is a perspective view of the assembled crossover tube before overmolding.
Figure 3:
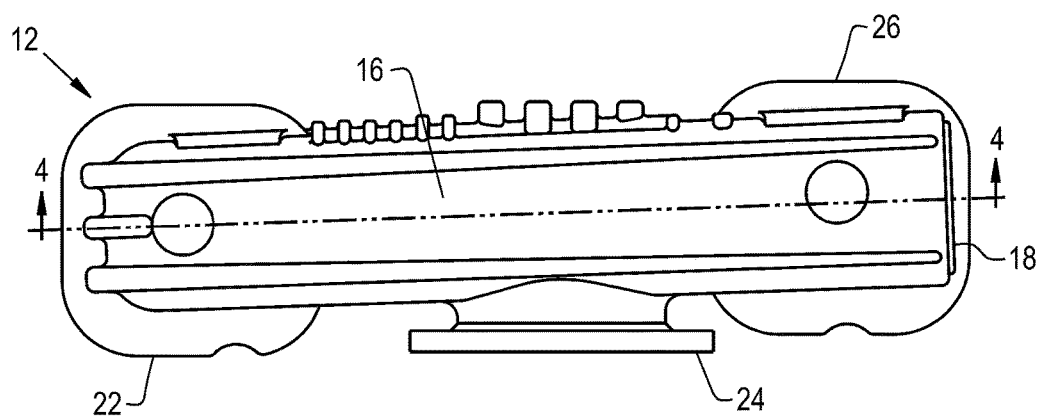
FIG. 3 is a plan view of the crossover tube assembly shown in FIG. 2.
Figure 5:
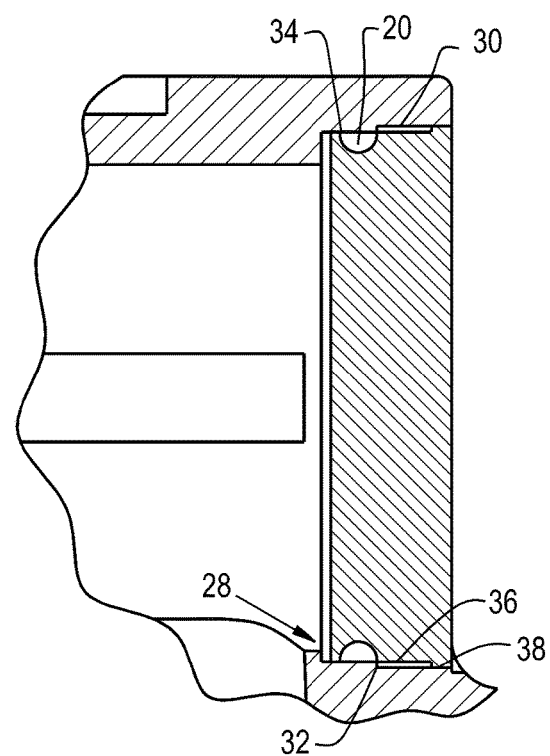
FIG. 5 is an enlarged view of a portion of the crossover tube assembly shown in FIG. 4.
Figure 6:
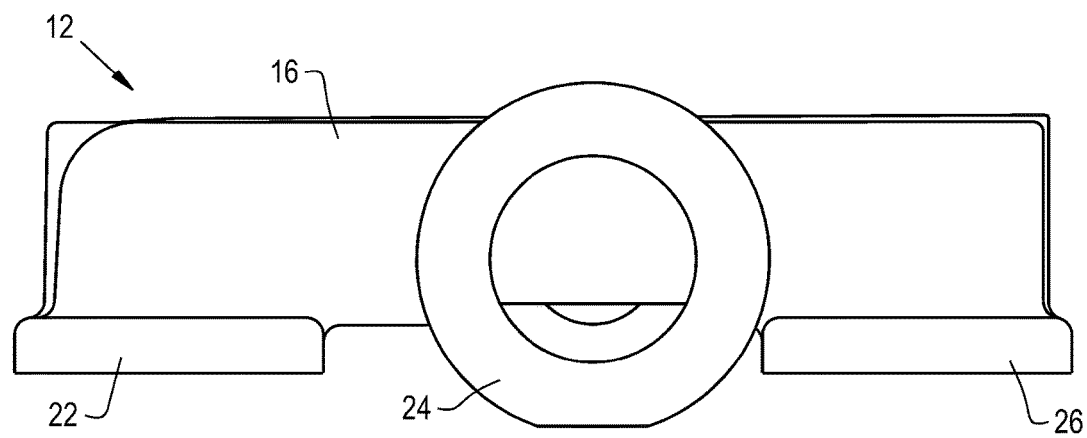
FIG. 6 is an elevational view of the crossover tube.
Figure 7:
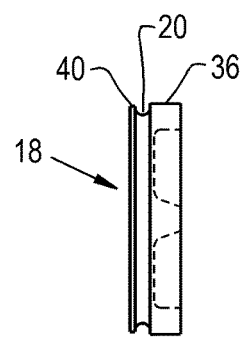
FIG. 7 is a an elevational view of the crossover tube cover.

Referring now more specifically to the drawings and to FIG. 1 and FIG. 2 in particular, an automotive cooling system manifold assembly 10 is shown, which includes a crossover tube assembly 12 having a manifold 14 overmolded thereon. Crossover tube assembly 12 includes a crossover tube 16 and crossover tube cover 18 welded to one another. Crossover tube cover 18 defines a flash trap 20 (FIG. 5) as disclosed herein.

It should be understood that manifold assembly 10 is merely an exemplary embodiment in which a flash trap as described herein can be used advantageously. Other types of manifold assemblies with crossover tube assemblies of other types therein also can employ the use of the present flash trap. Further, while a flash trap is described herein with respect to a manifold assembly in an automobile cooling system, it should be understood that the flash trap hereof also can be used in other types of assemblies and for welded joints established in structures and assemblies other than manifold assemblies in automobile cooling systems.

Figure 4:
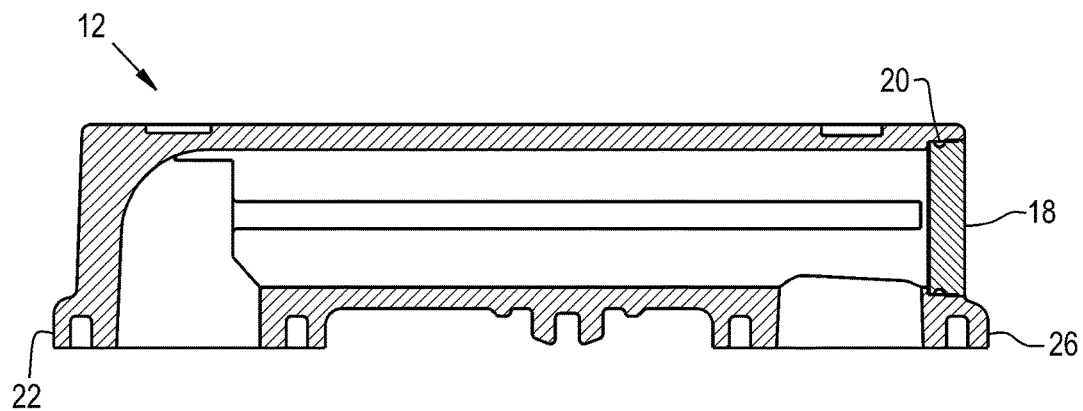
FIG. 4 is a cross-sectional view of the crossover tube assembly shown in FIGS. 2 and 3, the view being taken along line 4-4 of FIG. 3.

Crossover tube 16 is a generally elongated tubular body having fluid line connection fittings 22, 24, 26 for establishing fluid flow connections within an automobile cooling fluid circuit. Further, at one end thereof, crossover tube 16 defines an opening 28. An inner surface of opening 28 defines a first weld joint surface 30 surrounding opening 28. Inwardly of first weld joint surface 30, opening 28 further defines a shoulder 32 and an inner surface 34. Opening 28 is slightly narrower at inner surface 34 than at first weld joint surface 30. In other words, the opening 28 defines a stepped profiled with the inner surface 34 disposed laterally inward relative to the first weld joint surface 30. The fist weld joint surface 30 extends into the opening 287 from the end of the crossover tube 16 to a junction between the first weld joint surface 30 and the inner surface 34, and the inner surface 34 extends into the opening 28 from the junction between the first weld joint surface 30 and the inner surface 34 to a laterally extending (e.g., up and down from the perspective of FIGS. 4, 5, and 8)stop surface.

Crossover tube cover 18 is sized and configured to fit closely within open and 28. An edge of crossover tube cover 18 defines a second weld joint surface 36 surrounding crossover tube cover 18. In the assembled configuration of crossover tube assembly 12, crossover tube cover 18 fits closely within opening 28, and first weld joint surface 30 and second weld joint surface 36 confront one another to define a weld joint region 38. That is, the second weld joint surface 36 at least partially overlaps axially (e.g., along a longitudinal centerline defined along the opening 28) with the first weld joint surface 30, and the weld joint region 38 is arranged within a gap formed laterally between the first weld joint surface 30 and the second weld joint surface 36.

Flash trap 20 is a depression, hollow or valley adjacent second weld joint surface 36 on crossover tube cover 18. In the exemplary embodiment, flash trap 20 surrounds crossover tube cover 18 at the outer edge thereof. Accordingly, in the assembled configuration of crossover tube cover 18 within opening 28, flash trap 20 coextends with weld joint region 38.

Inwardly of flash trap 20, crossover tube cover 18 defines a lip 40 of slightly smaller diameter than a diameter defined by second weld joint surface 36. That is, the flash trap 20 is arranged inwardly from the end of the opening 28 between the weld joint region 38 and the lip 40 of the cross tube cover 18. The flash trap 20 is arranged inwardly from the end of the opening 28 relative to the weld joint region 38. Inner surface 34 extends over flash trap 20 and closely confronts lip 40, so that inner surface 34 and lip 40 together with flash trap 20 define an enclosed pocket or region in which weld flash can be received, captured and prevented from migrating more deeply into crossover tube 16.

During assembly of crossover tube assembly 12, crossover tube cover 18 is placed in opening 28 so that first weld joint surface 30 and second weld joint surface 36 overlie one another. Inner surface 34 and lip 40 closely confront. A welding process is initiated externally and directed inwardly, so that a weld joint 42 is established within weld joint region 38. As melt, or weld flash, is generated between first weld joint surface 30 and second weld joint surface 36, the weld flash is forced toward the interior of the crossover tube 16. As the weld flash migrates inwardly, the weld flash flows into flash trap 20 and is captured in the flash trap. Further migration of weld flash into crossover tube 16 is inhibited, and the weld flash is held away from an area where it could be dislodged during vehicle use, and then circulated by the coolant flowing through the system.

Figure 8:
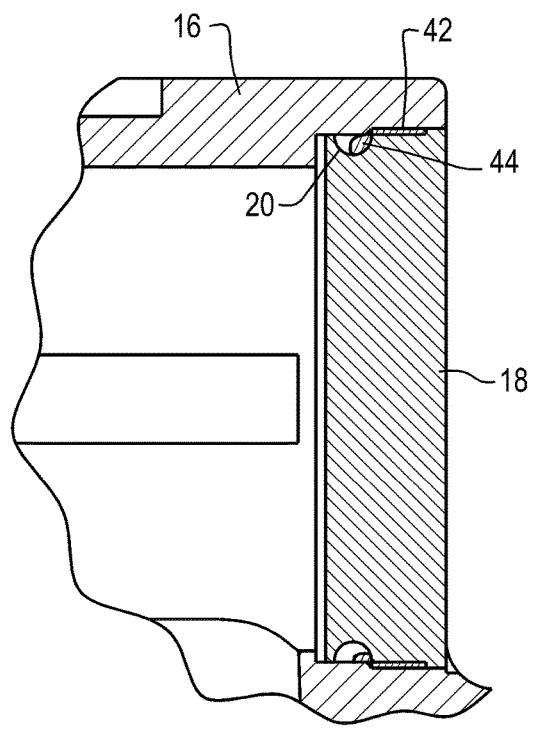
FIG. 8 is a cross-sectional view similar to FIG. 5, but illustrating weld flash captured in the weld trap.

The condition of weld flash having been captured and retained is shown in FIG. 8, wherein a volume of weld flash 44 is shown within flash trap 20. It should be understood that weld flash migrating beyond weld joint 42 may be sporadic and intermittent, and that weld flash may be present in flash trap 20 only at discrete and isolated locations. In some assemblies, no weld flash may be present in flash trap 20. However, flash trap 20 should define a volume sufficient for receiving a maximum amount of weld flash that would be created in a typical assembly and welding process.

Further variations and modifications of the foregoing are within the scope of the present invention. It is understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention. The claims are to be construed to include alternative embodiments to the extent permitted by the prior art.

Various features of the invention are set forth in the following claims.

What is claimed is:

1. A welded assembly, comprising:
   a first component including an opening arranged at a first end thereof, the opening defining a stepped profile and including a first weld joint surface and an inner surface; and
   a second component received within the opening and including a second weld joint surface and a flash trap formed in the second weld joint surface, wherein the second weld joint surface at least partially overlaps axially with the first weld joint surface, and wherein a weld joint region is arranged within a gap formed laterally between the first weld joint surface and the second weld joint surface, and
   wherein the flash trap forms a recess that extends laterally into the second weld joint surface and is arranged inwardly from the first end of the opening between the weld joint region and a lip of the second component.

2. The welded assembly of claim 1, wherein the first weld joint surface extends into the opening from the first end to a junction between the first weld joint surface and the inner surface, and the inner surface extends into the opening from the junction between the first weld joint surface and the inner surface to a laterally inwardly extending stop surface.

3. The welded assembly of claim 2, wherein the inner surface is disposed laterally inward relative to the first weld joint surface.

4. The welded assembly of claim 1, wherein the flash trap defines a generally U-shaped recess that extends continuously around a periphery of the second component.

5. The welded assembly of claim 1, wherein the flash trap, the lip, and the inner surface define an enclosed pocket.

6. The welded assembly of claim 1, wherein a diameter defined by the lip is less than a diameter defined by the second weld joint surface.

7. The welded assembly of claim 1, wherein the lip is arranged inwardly from the first end of the opening relative to the flash trap.

8. The welded assembly of claim 1, wherein the flash trap is arranged axially between the lip and the second weld joint surface.

9. A crossover tube assembly for an automobile cooling system; comprising:
   a crossover tube having an opening arranged at a first end thereof, wherein the opening includes a first weld joint surface extending inwardly into the opening from the first end; and
   a crossover tube cover disposed in the opening and including a second weld joint surface, wherein the second weld joint surface at least partially overlaps axially with the first weld joint surface, and wherein a weld joint region is arranged within a gap formed laterally between the first weld joint surface and the second weld joint surface, and
   wherein the second weld joint surface includes a depression extending laterally into the second weld joint surface and arranged inwardly from the first end of the opening relative to the weld joint region.

10. The crossover tube assembly of claim 9, wherein the opening defines a stepped profile and includes an inner surface.

11. The crossover tube assembly of claim 10, wherein the inner surface is disposed laterally inward relative to the first weld joint surface.

12. The crossover tube assembly of claim 11, wherein the first weld joint surface extends into the opening from the first end to a junction between the first weld joint surface and the inner surface, and the inner surface extends into the opening from the junction between the first weld joint surface and the inner surface to a laterally inwardly extending stop surface.

13. The crossover tube assembly of claim 9, wherein the depression defines generally U-shaped depression that extends continuously around a periphery of the crossover tube cover.

14. The crossover tube assembly of claim 9, wherein the crossover tube cover includes a lip arranged inwardly from the first end of the opening relative to the depression.

15. The crossover tube assembly of claim 14, wherein the depression, the lip, and the inner surface define an enclosed pocket.

16. The crossover tube assembly of claim 15, wherein a diameter defined by the lip is less than a diameter defined by the second weld joint surface.

17. A crossover tube assembly for an automobile cooling system, comprising:
   a crossover tube including an opening arranged at a first end thereof, the opening defining a stepped profile and including a first weld joint surface and an inner surface; and
   a crossover tube cover received within the opening and including a second weld joint surface and a flash trap formed in the second weld joint surface, wherein the second weld joint surface at least partially overlaps axially with the first weld joint surface, and wherein a weld joint region is arranged within a gap formed laterally between the first weld joint surface and the second weld joint surface, and
   wherein the flash trap forms a depression that extends laterally into the second weld joint surface and is arranged inwardly from the first end of the opening relative to the weld joint region.

18. The crossover tube assembly of claim 17, wherein the crossover tube cover includes a lip arranged inwardly from the first end of the opening relative to the flash trap.

19. The crossover tube assembly of claim 18, wherein the flash trap, the lip, and the inner surface define an enclosed pocket.

20. The crossover tube assembly of claim 17, wherein the flash trap defines generally U-shaped depression that extends continuously around a periphery of the crossover tube cover.

* * * * *